(12) United States Patent
Kojima et al.

(10) Patent No.: US 9,081,793 B2
(45) Date of Patent: Jul. 14, 2015

(54) CONTENT MANAGEMENT APPARATUS, CONTENT MANAGEMENT METHOD, AND PROGRAM

(71) Applicant: Panasonic Intellectual Property Corporation of America, Torrance, CA (US)

(72) Inventors: Yoshihiro Kojima, Hyogo (JP); Masaki Yamauchi, Osaka (JP); Akira Ishikawa, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 57 days.

(21) Appl. No.: 13/978,779

(22) PCT Filed: Jan. 11, 2013

(86) PCT No.: PCT/JP2013/000107
§ 371 (c)(1),
(2) Date: Jul. 9, 2013

(87) PCT Pub. No.: WO2013/108605
PCT Pub. Date: Jul. 25, 2013

(65) Prior Publication Data
US 2014/0046988 A1 Feb. 13, 2014

Related U.S. Application Data

(60) Provisional application No. 61/587,162, filed on Jan. 17, 2012.

(51) Int. Cl.
*G06F 17/30* (2006.01)
(52) U.S. Cl.
CPC ...... *G06F 17/30194* (2013.01); *G06F 17/3002* (2013.01); *G06F 17/30156* (2013.01)

(58) Field of Classification Search
CPC ........................................................ G06F 17/30
USPC .................................................. 707/600–899
See application file for complete search history.

(56) References Cited

U.S. PATENT DOCUMENTS

| 7,730,113 | B1 * | 6/2010 | Payette et al. ................. 707/821 |
| 2010/0057785 | A1 | 3/2010 | Khosravy et al. | |
| 2010/0179984 | A1 * | 7/2010 | Sebastian ..................... 709/203 |

FOREIGN PATENT DOCUMENTS

| JP | 2002-259396 | 9/2002 |
| JP | 2007-148886 | 6/2007 |
| JP | 2010-225184 | 10/2010 |
| WO | 2010/027653 | 3/2010 |

OTHER PUBLICATIONS

International Search Report issued Feb. 5, 2013 in International (PCT) Application No. PCT/JP2013/000107.

* cited by examiner

*Primary Examiner* — Isaac M Woo
(74) *Attorney, Agent, or Firm* — Wenderoth, Lind & Ponack, L.L.P.

(57) ABSTRACT

A content management apparatus includes: an uploaded content detection unit which detects a content item uploaded to a network service by a user; a management information generation unit which generates management information of: the content item uploaded to the network service by the user; and a content item stored on a device connected to a network; an uploaded content information storage unit which stores the management information of the uploaded content item; a home content information storage unit which stores the management information of the content item stored on the device; a home content detection unit which detects a new content item newly stored on the device; and an identification unit which verifies, when the new content item is detected, whether the new content item and the content item whose management information is stored on the uploaded content information storage unit are identical.

10 Claims, 14 Drawing Sheets

FIG. 4A

Home content information storage unit ~111

| ID | Storage location | Link information | | Attribute information | | Meta-information | |
|---|---|---|---|---|---|---|---|
| | | Linked destination | Operational information | Resolution | ..... | Date and time of capturing | ..... |
| 001 | Device A | | | 1920 × 1080 | ..... | 2011/1/20 | ..... |
| 002 | Device A | ID:101 | Original | 1920 × 1080 | ..... | 2011/1/20 | ..... |
| 003 | Device B | | | 960 × 480 | ..... | 2011/2/18 | ..... |
| ... | ... | ... | ... | ... | ... | ... | ... |

FIG. 4B

Uploaded content information storage unit — 110

| ID | Storage location | Link information | | Attribute information | | Meta-information | |
|---|---|---|---|---|---|---|---|
| | | Linked destination | Operational information | Resolution | .... | Date and time of capturing | .... |
| 101 | SNS1 | ID:002 | Copy | 1024 × 768 | .... | | .... |
| 102 | SNS1 | ID:008 | | 1024 × 768 | .... | | .... |
| 103 | SNS2 | | Copy | 960 × 480 | .... | 2011/2/13 | .... |
| ... | ... | ... | ... | ... | ... | ... | ... |

CONTENT MANAGEMENT APPARATUS, CONTENT MANAGEMENT METHOD, AND PROGRAM

TECHNICAL FIELD

The present invention relates to a content management apparatus and a content management method for managing content items owned by a user.

BACKGROUND ART

In recent years, following the progress in digitalization and networking, large amounts of AV content including photos, videos, and so on are being stored on various home electronic devices (home AV devices such as TVs and hard disc recorders, information devices such as personal computers and tablets, and mobile devices such as digital video cameras, digital cameras, and smart phones). Therefore, when a user wants to view such a content item, it has been difficult for the user to find the content item unless he/she remembers on which part of which device each of the content items is stored. In the case where the user edited a content item with a device such as a personal computer, and then copied the content item to a different device, it has been difficult for the user to find the unedited (original) content item of the content item he/she is viewing.

With regard to this problem, a system (content management system) has been proposed in which all content items at home are managed centrally (see Patent Literature (PTL) 1 and PTL 2, for example).

In such a content management system, a home network is established in which each of the electronic devices is connected via a network. A content management database is created which centrally manages attribution (storage location, format, and a date and time of creation, for example) of content items stored on each electronic device. A content management apparatus which manages the database is set on the home network.

With the above content management system, the user does not have to remember on which device a content item he/she wants to view is stored, and the user can easily view the target content item simply by searching the content management database. Furthermore, since the history of edition made to the content item is also managed centrally, the user can easily find the original content item of the content item he/she is viewing.

CITATION LIST

Patent Literature

[PTL 1] Japanese Unexamined Patent Application Publication No. 2002 - 259396
[PTL 2] WO 2010/027653

SUMMARY OF INVENTION

Technical Problem

It is desired for such a content management apparatus to shorten the processing time.

Therefore, the present invention has an object to provide a content management apparatus by which the processing time can be shortened.

Solution to Problem

In order to achieve the above object, a content management apparatus according to an aspect of the present invention is a content management apparatus which manages content items owned by a user, the content management apparatus includes: a first detection unit configured to detect a content item uploaded to a network service by the user; a management information generation unit configured to generate: management information of the content item uploaded to the network service by the user; and management information of a content item stored on a device connected to the content management apparatus via a network; a first management information storage unit configured to store the management information of the uploaded content item; a second management information storage unit configured to store the management information of the content item stored on the device; a second detection unit configured to detect a new content item newly stored on the device; an identification unit configured to verify using a first scheme whether the new content item and a first content item are identical when the new content item is detected, the first content item being a content item whose management information is stored on the first management storage unit out of the first management information storage unit and the second management information storage unit; and a link information generation unit configured to generate link information when the first content item and the new content item are identical, the link information indicating that the first content item and the new content item are identical, wherein the management information generation unit is configured to (1) add the link information to the management information of the first content item or (2) generate management information, including the link information, of the new content item.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Advantageous Effects of Invention

The present invention provides a content management apparatus which shortens the processing time.

BRIEF DESCRIPTION OF DRAWINGS

FIG. 4A shows an example of management information according to Embodiment 1.

FIG. 4B shows an example of management information according to Embodiment 1.

DESCRIPTION OF EMBODIMENTS

Figure 1:
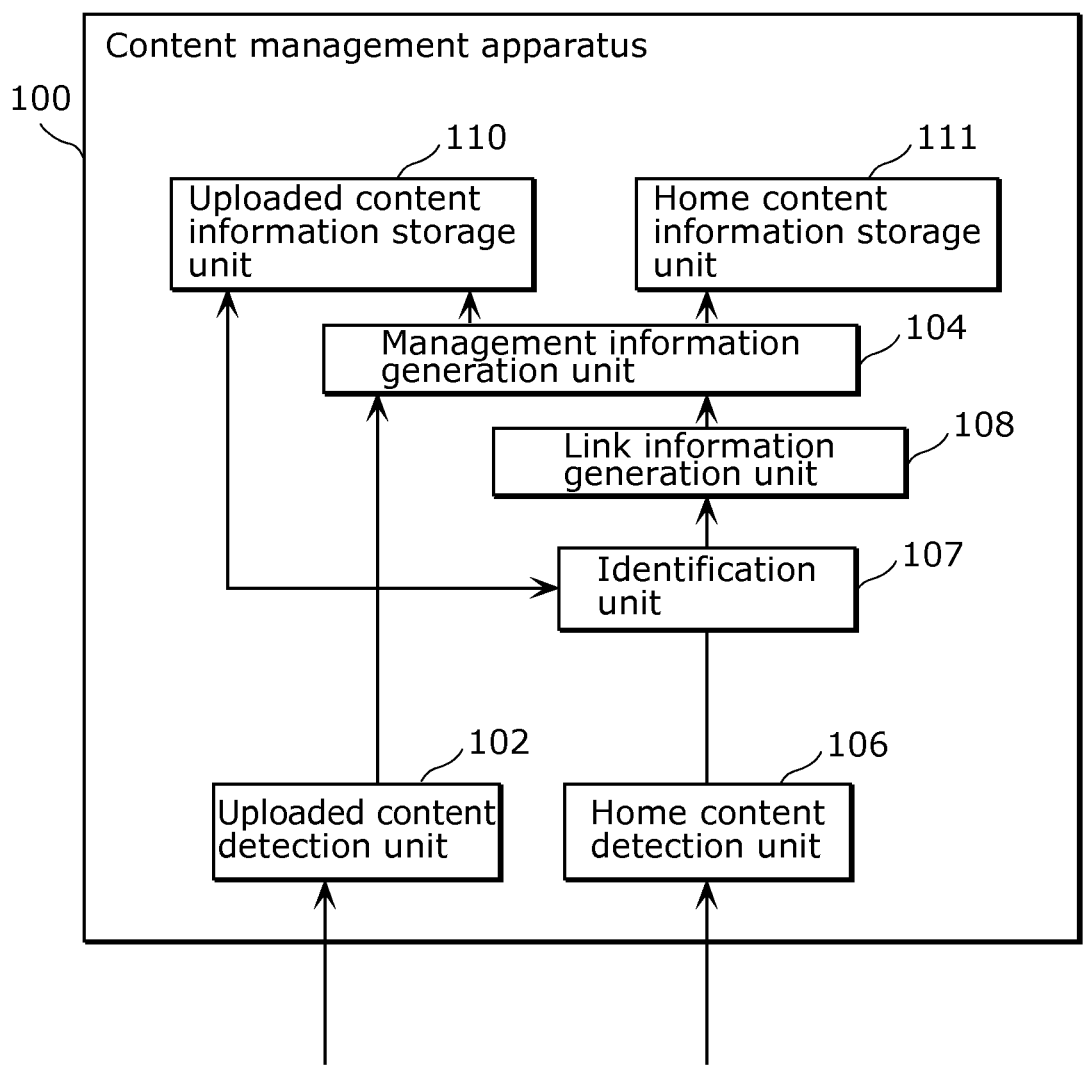
FIG. 1 is a block diagram of a content management apparatus according to Embodiment 1.

[Embodiment 1]
[Underlying Knowledge Forming Basis of the Present Disclosure]

Applicants have found that the conventional technique has the following problem.

Recently, with the increase in the speed of broadband communications and the widespread use of the cloud services, a user can not only store a content item at home but also upload the content item to commercial services such as social networking services (SNS) on the Internet. With this, the user can easily view the content item and share the content item with his/her friends via the Internet. Recent years have also seen an increase in the speed of wireless broadband, and the widespread use of mobile devices such as smart phones having cameras and digital cameras having wireless communication functions. With this, the user can store AV content items, such as photos and movies he/she has captured, on these Internet services directly and from anywhere.

Accordingly, to centrally manage all AV content items owned by the user, it is required to manage, in addition to the AV content items within the home network, AV content items uploaded by the user from outside of the home directly to the Internet service using the mobile device, by registering such content items to the content management apparatus.

With the conventional content management system, it is possible to centrally manage the AV content items stored on each of the electronic devices at home. However, there is a problem that it is difficult to centrally manage the AV content items stored outside of the home network, for example on an Internet service, in the same manner as the AV content items at home.

The details are given below. The following scheme is given as one of the schemes for centrally managing the AV content items, which is uploaded by the user from outside of the home directly to the Internet services using the mobile device, by the content management system. For example, the content management apparatus downloads the AV content items stored on an Internet service to a certain region of a certain electronic device on the home network, and stores the downloaded AV item. Thus, the content management apparatus can register these AV content items in the content management database.

However, next, when the mobile device used for uploading is connected to the home network, the AV content items stored on the mobile device are also registered on the content management database. Thus, an identical content item is double registered. As a result, the content item uploaded to the Internet service and the content item stored on the mobile device through which the content item is created are registered in the management database not as a copied version and an original content but as totally different content items. As described above, there is a problem that a content item stored on an Internet service and a content item on a home network cannot be managed centrally.

With respect to this problem, a scheme can be given in which, for example, when registering a new content item on the content management database, the content management apparatus searches the content management database using meta-information (meta data) added to the content item as a search key. The meta-information is, for example in the case of photos, capturing information (Exif data) indicating the time and date, location, and so on. If the identical content item which has already been registered can be detected with the above manner, it is possible to prevent the identical content item to be double registered on the management database.

However, usually, in commercial SNSs, when AV content items are uploaded, in order to store the AV content items efficiently, processing to reduce the size of the content items is automatically performed. The processing includes compression of the AV content items, deletion of the meta-information, and so on. Accordingly, in some cases the meta-information which is to be the search key is not present when such AV content items are downloaded. Therefore, to avoid double registration in such cases, the content management apparatus has to determine whether or not the content items are identical, by directly performing matching on content (for example, image pattern or moving image pattern) of the content item to be newly registered and content of all content items registered in the content management database. However, pattern matching on images or moving images requires a very long processing time. Particularly, to perform matching with all the content items at home requires an immense amount of time, according to the findings by the Applicants.

In the present embodiment, a content management apparatus is described which is capable of: centrally managing a user-owned content item uploaded by the user from outside of the home to an Internet service such as an SNS using a mobile device, in the same manner as for the content items on the home network at home; and shortening the processing time required to create the management database.

A content management apparatus according to an aspect of the present invention is a content management apparatus which manages content items owned by a user, the content management apparatus including: a first detection unit configured to detect a content item uploaded to a network service by the user; a management information generation unit configured to generate: management information of the content item uploaded to the network service by the user; and management information of a content item stored on a device connected to the content management apparatus via a network; a first management information storage unit configured to store the management information of the uploaded content item; a second management information storage unit configured to store the management information of the content item stored on the device; a second detection unit configured to detect a new content item newly stored on the device; an identification unit configured to verify using a first scheme whether the new content item and a first content item are identical when the new content item is detected, the first content item being a content item whose management information is stored on the first management storage unit out of the first management information storage unit and the second management information storage unit; and a link information generation unit configured to generate link information when the first content item and the new content item are identical, the link information indicating that the first content item and the new content item are identical, wherein the management information generation unit is configured to (1) add the link information to the management information of the first content item or (2) generate management information, including the link information, of the new content item.

With this configuration, with the content management apparatus, the management information of the content item stored on the device connected to the network and the management information of the content item uploaded to the network service are separately stored. When a new content item newly stored on the device connected to the network is detected, with the content management apparatus, it is verified whether the new content item and the content item uploaded to the network service are identical. Thus, with the content management apparatus, the processing time can be shortened, since the content item uploaded to the network service can be extracted easier than in the case where the content item stored on the device and the uploaded content item are managed in a single database.

For example, the identification unit may be configured to, as the first scheme, perform image pattern matching on the new content item and the first content item.

With this configuration, the content management apparatus can shorten the processing time significantly, since the number of image pattern matching processing which requires a long processing time can be reduced.

For example, meta-information may be added to the new content item and the content item stored on the device, the meta-information indicating at least one of: a date and time when the content item is captured; and an environment in which the content item is captured, and the identification unit may be further configured to verify whether the new content item and the content item stored on the device are identical, using the meta-information added to the new content item and the meta-information added to the content item stored on the device.

For example, the meta-information may not be added to the uploaded content item, the meta-information indicating at least one of: a date and time when the content item is captured; and an environment in which the content item is captured.

For example, the first management information storage unit may store management information items of uploaded content items including the uploaded content item, and when the new content item is detected, the identification unit may: determine an unlinked content item; and verify using the first scheme whether the unlinked content item and the new content item are identical, the unlinked content item being a first content item to which the link information is not added out of first content items whose management information is stored on the first management information storage unit.

With this configuration, the content management apparatus: determines a content item, which is newly uploaded and to which the link information is not added, out of the first content items; and verifies whether the content item and the new content item are identical. Thus, with the content management apparatus, the processing time can be shortened even more.

For example, the network may be a home network, the uploaded content item may be a content item based on a second content item held by a mobile device and uploaded by the user from the mobile device to the network service not via the home network, and the second detection unit may, when the mobile device is connected to the home network, detect the second content item held by the mobile device as the new content item.

For example, the content management apparatus may further include a third management information storage unit configured to store management information of an unverified content item, wherein, when the new content item is detected, the identification unit may be configured to: compare a capturing time of the new content item with a check time indicating a last time at which the first detection unit has successfully checked a content item uploaded to the network service to detect the content item uploaded to the network service; when the capturing time is earlier than the check time, verify using a first scheme whether the new content item and the first content item are identical; and when the capturing time is later than the check time, after the check time is updated and the updated check time has become later than the capturing time, verify whether the new content item and the first content item are identical.

With this configuration, even when it is impossible to check the content item uploaded to the network service because of a communication failure for example, the content management apparatus can correctly verify whether the uploaded content item and the new content item are identical.

Furthermore, a content management method according to an aspect of the present invention includes: detecting a content item uploaded to a network service by the user; generating management information of the content item uploaded to the network service by the user; storing the management information of the uploaded content item on a first management information storage unit; generating management information of a content item stored on a device connected to the content management apparatus via a network; storing the management information of the content item stored on the device on a second management information storage unit; detecting a new content item newly stored on the device; verifying using a first scheme whether the new content item and a first content item are identical when the new content item is detected, the first content item being a content item whose management information is stored on the first management storage unit out of the first management information storage unit and the second management information storage unit; generating link information indicating that the first content item and the new content item are identical when the first content item and the new content item are identical; and (1) adding the link information to the management information of the first content item or (2) generating management information, including the link information, of the new content item.

Thus, with the content management method, the management information of the content item stored on the device connected to the network and the management information of the content item uploaded to the network service are separately stored. When a new content item newly stored on the device connected to the network is detected, with the content management method, it is verified whether the new content item and the content item uploaded to the network service are identical. Thus, with the content management method, the processing time can be shortened, since the content item uploaded to the network service can be extracted easier than in the case where the content item stored on the device and the uploaded content item are managed in a single database.

Furthermore, a program according to an aspect of the present invention is a program for causing a computer to execute the above content management method.

Furthermore, an integrated circuit according to an aspect of the present invention is an integrated circuit which manages content items owned by a user, the integrated circuit including: a first detection unit configured to detect a content item uploaded to a network service by the user; a management information generation unit configured to generate: management information of the content item uploaded to the network service by the user; and management information of a content item stored on a device connected to the content management apparatus via a network; a first management information storage unit configured to store the management information of the uploaded content item; a second management information storage unit configured to store the management information of the content item stored on the device; a second detection unit configured to detect a new content item newly stored on the device; an identification unit configured to verify using a first scheme whether the new content item and a first content item are identical when the new content item is detected, the first content item being a content item whose management information is stored on the first management storage unit out of the first management information storage unit and the second management information storage unit; and a link information generation unit configured to generate link information when the first content item and the new content item are identical, the link information indicating that the first content item and the new content item are identical, wherein the management information generation unit is configured to (1) add the link information to the management information of the first content item or (2) generate management information, including the link information, of the new content item.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Embodiments according to the present invention are described below with reference to the drawings.

It is to be noted that each of the embodiments described below is a comprehensive or specific example of the present invention. Numeric values, shapes, materials, constituents, positions and topologies of the constituents, steps, an order of the steps, and so on in the following embodiments are an example of the present invention, and it should therefore not be construed that the present invention is limited by these embodiments. Furthermore, out of the constituents in the following embodiments, the constituents not stated in the independent claims describing the broadest concept of the present invention are described as optional constituents.

[Embodiment 1]

With a content management apparatus according to the present embodiment, when a new content item newly stored on the device connected to a home network is detected, with the content management apparatus, it is verified whether the new content item and the content item uploaded to the network service are identical. Thus, with the content management apparatus, the processing time can be shortened as compared to the case where it is verified whether the new content item and all the content items are identical.

First, description is provided on a schematic configuration and an operation of a content management apparatus 100 according to the present embodiment.

FIG. 1 is a block diagram showing a schematic configuration of the content management apparatus 100 according to the present embodiment, The content management apparatus 100 shown in FIG. 1 centrally manages content items owned by a user. This content management apparatus 100 includes: an uploaded content detection unit 102; a management information generation unit 104; a home content detection unit 106; an identification unit 107; a link information generation unit 108; an uploaded content information storage unit 110; and a home content information storage unit 111.

The uploaded content detection unit 102 is an example of the first detection unit, and detects a content item uploaded to a network service by a user.

The management information generation unit 104 generates management information of the uploaded content item uploaded to the network service by the user. Furthermore, the management information generation unit 104 generates management information of home content items which are stored on a home device connected to the home network.

The uploaded content information storage unit 110 is an example of the first management information storage unit, and stores the management information of the uploaded content item.

The home content information storage unit 111 is an example of the second management information storage unit, and stores the management information of the home content item.

The home content detection unit 106 is an example of the second detection unit, and detects a new content item newly stored on the home device.

When the new content item is detected, the identification unit 107 verifies, using a first scheme, whether the new content item and the uploaded content item (a first content item) are identical. The first content item is an uploaded content item whose management information is stored on the uploaded content information storage unit 110 out of the uploaded content information storage unit 110 and the home content information storage unit 111. Here, the first scheme is, for example, a scheme to compare content of the uploaded content item and content of the new content item, and specifically a scheme to perform image pattern matching on the new content item and the uploaded content item.

The link information generation unit 108 generates, when the uploaded content item and the new content item are identical, link information indicating that the uploaded content item and the new content item are identical.

Furthermore, when the uploaded content item and the new content item are identical, the management information generation unit 104 (1) adds the link information to the management information of the uploaded content item or (2) generates management information, including the link information, of the new content item.

Figure 2:
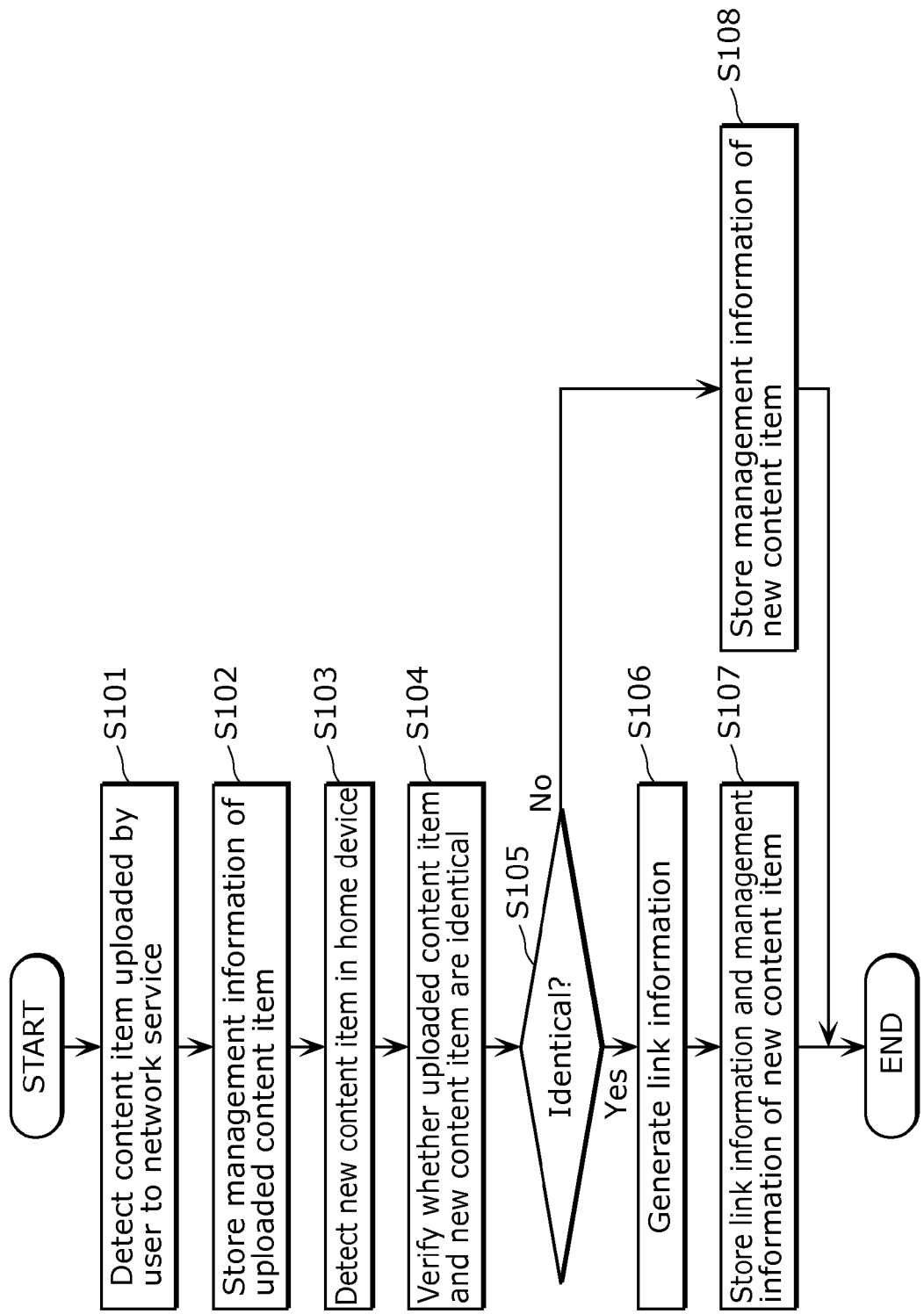
FIG. 2 is a flowchart of content management processing performed by the content management apparatus according to Embodiment 1.

FIG. 2 is a flowchart of content management processing (content management method) performed by the content management apparatus 100.

First, the uploaded content detection unit 102 detects an uploaded content item uploaded to the network service by the user (S101). Next, the management information generation unit 104 generates management information of the detected uploaded content item, and stores the generated management information on the uploaded content information storage unit 110 (S102). This processing is performed every time a new uploaded content item is detected.

Next, the home content detection unit 106 detects a new content item newly stored on the home device (S103). Next, when the new content item is detected, the identification unit 107 verifies whether the new content item and the uploaded content item are identical (S104).

When the uploaded content item and the new content item are identical (Yes in S105), the link information generation unit 108 generates link information indicating that the uploaded content item and the new content item are identical (S106). Next, the management information generation unit 104 stores the generated link information and the management information of the new content item (S107). Specifically, the management information generation unit 104 adds the link information to the management information of the uploaded content item stored on the uploaded content information storage unit 110. Furthermore, the management information generation unit 104 generates management information, including the link information, of the new content item, and stores the generated management information on the home content information storage unit 111. It is to be noted that the management information generation unit 104 may perform only one of adding the link information to the management information of the uploaded content item and generating management information, including the link information, of the new content item.

In contrast, when the uploaded content item and the new content item are not identical (No in S105), the management information generation unit 104 generates management information of the new content, and stores the generated management information on the home content information storage unit 111 (S108).

With the above, when the new content item newly stored on the home device is detected, the content management apparatus 100 verifies whether the new content item and the uploaded content item whose management information is stored on the uploaded content information storage unit 110 are identical. Thus, with the content management apparatus 100, the processing time can be shortened as compared to the case where it is verified whether the new content item and both of the uploaded content items and home content items are identical.

Details are given below on the content management apparatus 100 and its operation.

Figure 3:
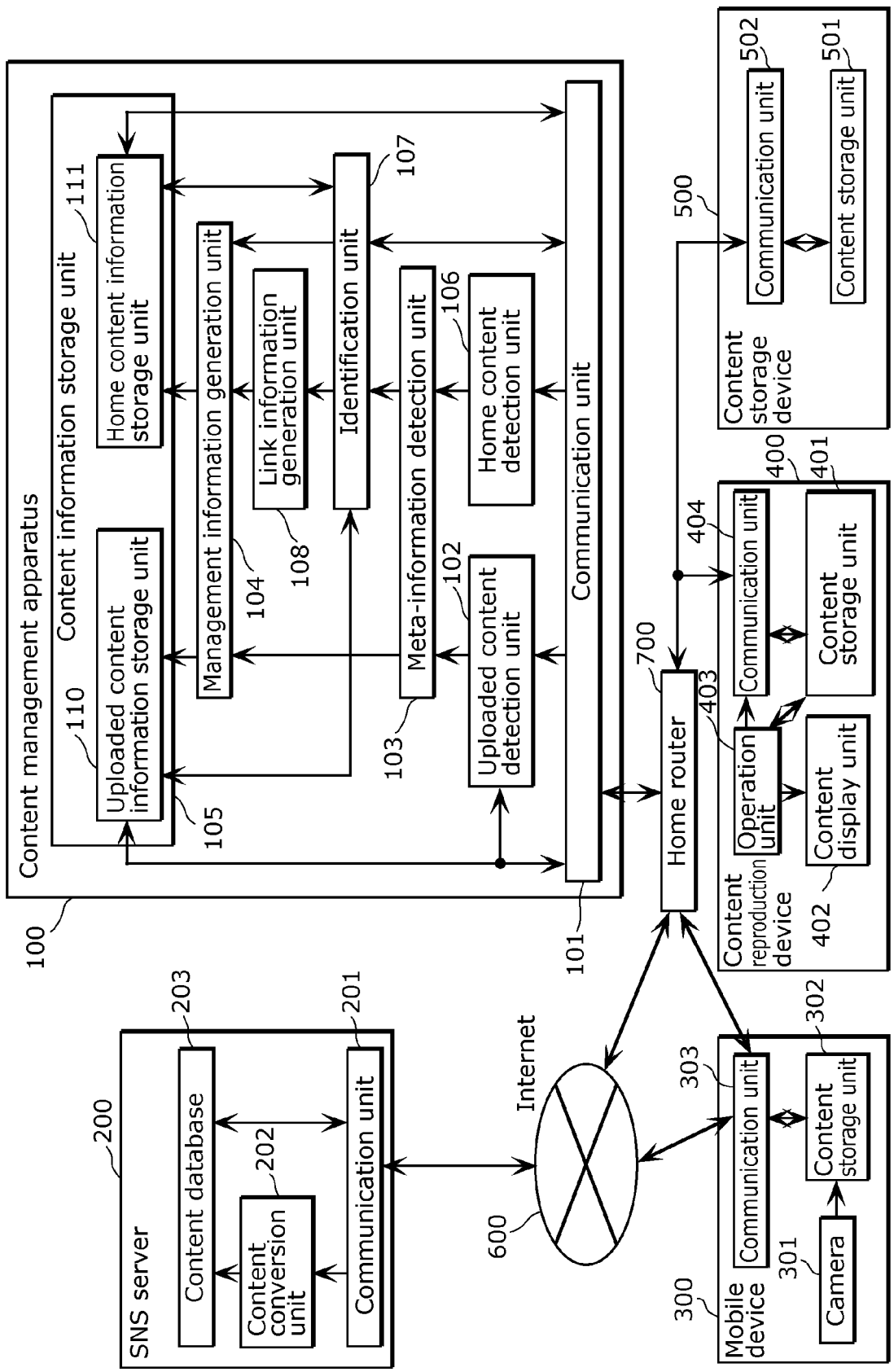
FIG. 3 is a block diagram of a content management system including the content management apparatus according to Embodiment 1.

FIG. 3 is a block diagram showing a configuration of a content management system including the content management apparatus 100 according to the present embodiment. The content management system indicated in FIG. 3 includes: the content management apparatus 100; an SNS server 200; a mobile device 300; a content reproduction device 400; a content storage device 500; the Internet 600; and a home router 700.

The content management apparatus 100 manages home content items (photos, videos, and so on) stored on home devices which are various electronic devices connected to a home network at home (home LAN). The home devices include, for example, home AV devices such as TVs and hard disc recorders, information devices such as personal computers and tablets, and mobile devices such as movie cameras, digital cameras, and smart phones. Furthermore, the content management apparatus 100 manages uploaded content items which are uploaded to and stored on a network service (SNS, for example) by the user via the Internet. Furthermore, the content management apparatus 100 centrally manages these home content items and the uploaded content items. For example, the content management apparatus 100 is embedded to any one of the home devices connected to the home network.

The SNS server 200 provides, for example, an SNS such as Facebook (registered trademark) or mixi (registered trademark). As a part of its service, the SNS server 200 has a function to store the content items such as photos and movies owned by a user to allow the user to share the content items with his/her friends.

This SNS server 200 is an example of a server of the network service (Internet service), and includes: a communication unit 201; a content conversion unit 202; and a content database 203. The communication unit 201 communicates data via the Internet 600. The content database 203 manages the content item uploaded by the user. The content conversion unit 202 reduces the data amount of the content item transmitted from the user, in order to store a large amount of content items from many users. Specifically, the content conversion unit 202 performs processing to: compress the content item; and for a case of photos, delete meta-information such as capturing information (Exif) etc.; and so on.

Examples of the mobile device 300 include: AV mobile devices such as digital cameras, digital movie cameras, and so on with a wireless communication function; mobile phones with a camera function; smart phones; or the like. This mobile device 300 has a function to wirelessly transmit the captured photos or movies to the SNS server 200 via wireless communication.

This mobile device 300 includes a camera 301, a content storage unit 302, and a communication unit 303. The camera 301 captures content items such as photos, movies, and so on. The content storage unit 302 stores the content items captured by the camera 301. The communication unit 303 uploads the content items stored on the content storage unit 302 to the SNS server 200 via the Internet 600. Furthermore, the communication unit 303 transmits, via the home network (home router 700), the content items to the content management apparatus 100 or other home devices (the content reproduction device 400 and the content storage device 500).

The content reproduction device 400 is an example of the home devices, and is, for example, a digital TV, a personal computer, or the like having digital living network alliance (DLNA) function. The content reproduction device 400 has a function to display the content items stored on a home device connected to the home network.

This content reproduction device 400 includes: a content storage unit 401; a content display unit 402; an operation unit 403; and a communication unit 404. The content storage unit 401 stores content items. The content display unit 402 displays content items which the user wants to view. The operation unit 403 stores content items on the content storage unit 401, and performs content display control on the content display unit 402. The communication unit 404 communicates, via the home network, with the content management apparatus 100 and other home devices (the mobile device 300 and the content storage device 500).

The content storage device 500 is an example of the home devices, and is a network attached storage (NAS) or a home server, which stores content items. The content storage device 500 includes a content storage unit 501 and a communication unit 502. The content storage unit 501 stores content items. The communication unit 502 communicates, via the home network, with the content management apparatus 100 and other home devices (the mobile device 300 and the content reproduction device 400).

Finally, a configuration of the content management apparatus 100 is described in detail.

The content management apparatus 100 includes: a communication unit 101; an uploaded content detection unit 102; a meta-information detection unit 103; a management information generation unit 104; a content information storage unit 105; a home content detection unit 106; an identification unit 107; and a link information generation unit 108.

The communication unit 101 communicates, via the home network (home router 700), with the mobile device 300, and the content reproduction device 400 and the content storage device 500 which are installed at home. Furthermore, the communication unit 101 communicates, via the home router 700 and the Internet 600, with the SNS server 200.

The uploaded content detection unit 102 detects whether or not a new content item, which is uploaded by the user from outside of the home using the mobile device 300, is present in the content database 203 of the SNS server 200.

The home content detection unit 106 detects whether or not a new content item, which is newly stored, is present in the content storage units 302, 401, and 501 of the home devices connected to the home network.

The meta-information detection unit 103 detects whether or not meta-information is added to the content item detected by the uploaded content detection unit 102 and the new content item detected by the home content detection unit 106.

The content information storage unit 105 holds management information for centrally managing all content items owned by the user, that are stored on: the SNS server 200 connected via the Internet; and the home device connected via the home network. This content information storage unit 105 includes: an uploaded content information storage unit 110 which stores management information of the uploaded content items uploaded to the SNS server 200 by the user; and a home content information storage unit 111 which stores management information of home content items stored on the home devices.

FIG. 4A shows an example of management information of the home content items stored on the home content information storage unit 111. Furthermore, FIG. 4B shows an example of management information of the uploaded content items stored on the uploaded content information storage unit 110.

As shown in FIG. 4A and FIG. 4B, the management information includes for example: a universal index (ID) indicating serial numbers for centrally managing all the content items owned by the user; information indicating a device and a location where the content items are stored; general content attribute information; meta-information of the content items; and the link information. The attribute information indicates the content item's resolution, a date and time of creation, data size, and so on. The meta-information is capturing information such as Exif, and indicates a date and time of capturing and capturing conditions (location of capturing, camera setting, and so on). The link information includes: information on link destination indicating another content item identical to the content item; and operational information indicating whether the content item is the original content item or a copied version generated through copy or edition. Although in FIG. 4A and FIG. 4B only the information on the device is indicated as the storage location of the content item, information on the storage position (address) in the device may be further indicated.

The identification unit 107 verifies whether the uploaded content item uploaded to the SNS server 200 and the new content item detected by the home content detection unit 106 are identical. It is to be noted that when the two content items are identical, it means that the two content items have substantially the same meaning (content). For example, when the first content item is the content item obtained by compressing the data of the second content item, the two content items are identical. Specifically, when a new content item detected by the home content detection unit 106 is the original content item of the content item which is uploaded to the SNS server 200, it is defined that these two content items are identical. In other words, the identification unit 107 detects the original content item of the content item compressed and stored by the content conversion unit 202 in the SNS server 200, out of the content items stored on the content storage unit 302 of the mobile device 300.

When the identification unit 107 determines that the content item uploaded to the SNS server 200 and the new content item detected by the home content detection unit 106 are identical, the link information generation unit 108 generates link information indicating that the two content items are identical.

The management information generation unit 104 performs processing to embed the link information generated by the link information generation unit 108 to: the management information of the content item uploaded to the SNS server 200; and the management information of the new content item detected by the home content detection unit 106.

Next, a flow of content management processing performed by the content management apparatus 100 is described.

Figure 5:
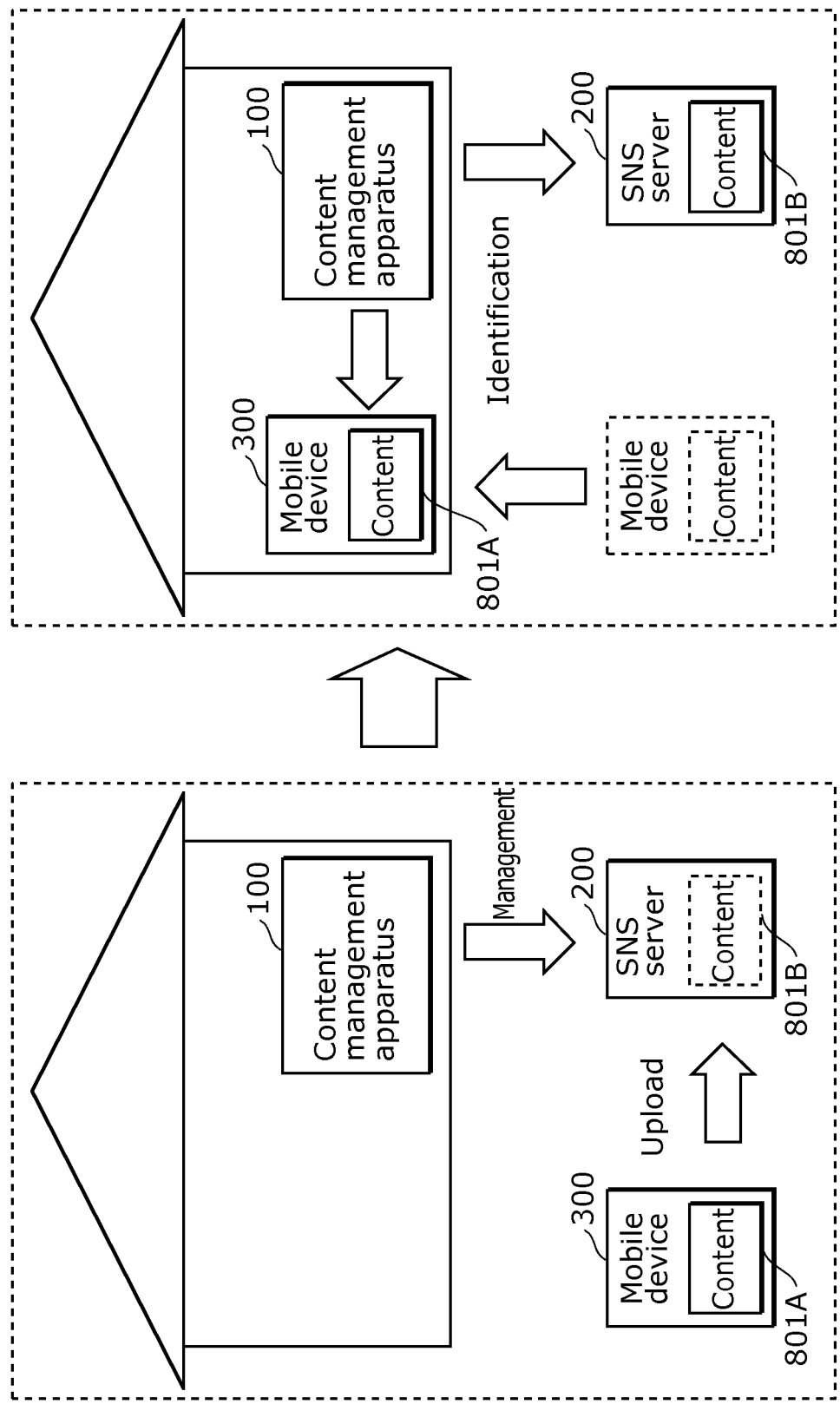
FIG. 5 is a schematic diagram for illustrating the content management processing according to Embodiment 1.

FIG. 5 is a schematic diagram which illustrates an overview of an operation performed in the content management processing. As shown in FIG. 5, firstly, the user captures a content item 801A using the mobile device 300 outside of the home. Then, the user uploads, from outside of the home and not using the home network, the content item 801A to the SNS server 200. Thus, a content item 801B identical to the content item 801A is held by the SNS server 200. Furthermore, the content management apparatus 100 detects and manages the content item 801B uploaded to the SNS server 200.

Next, the user brings home the mobile device 300 and connects the mobile device 300 to the home network. Thus, the content management apparatus 100 detects the content item 801A held by the mobile device 300 as a new content item. Then, the content management apparatus 100 verifies whether the content item 801A and the content item 801B held by the SNS server 200 are identical.

Figure 6:
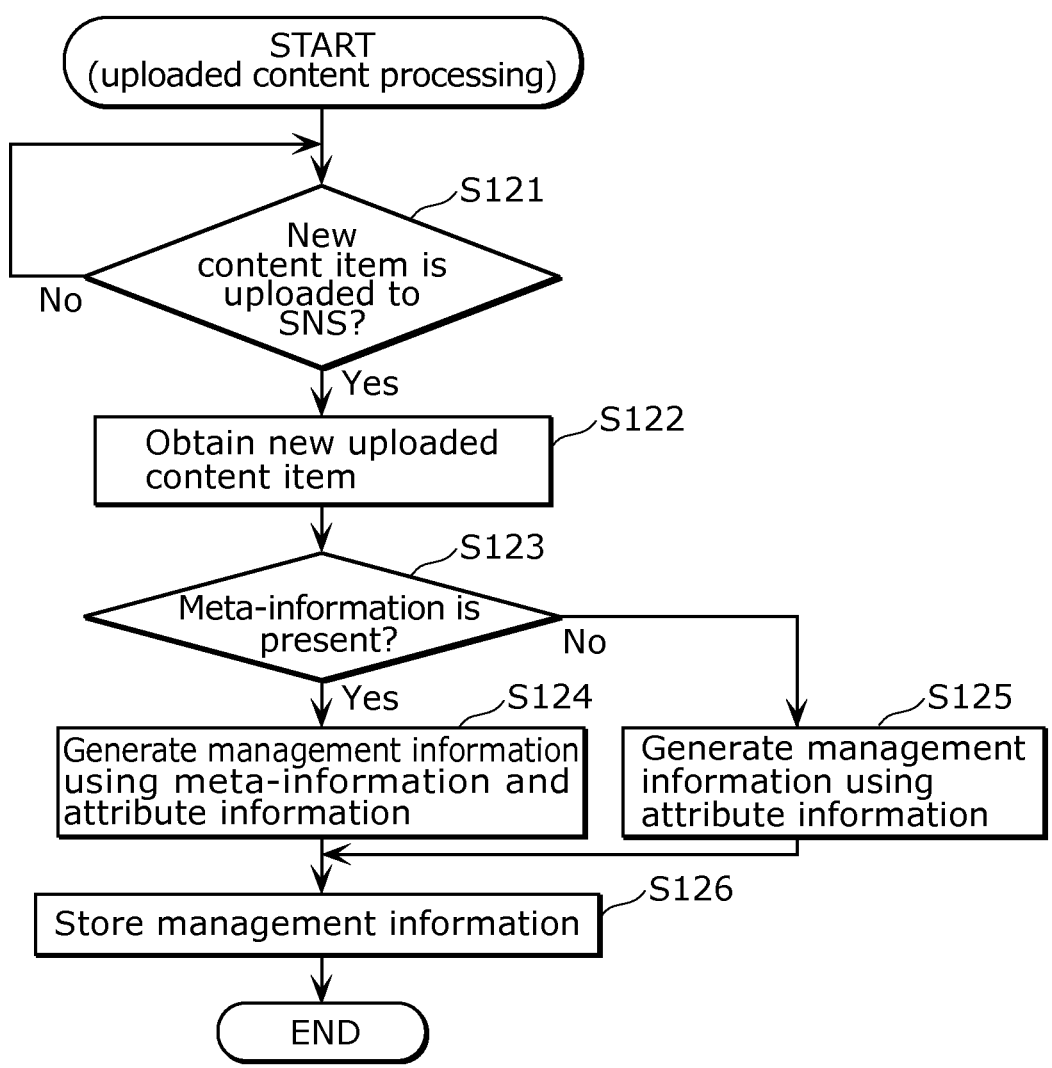
FIG. 6 is a flowchart of uploaded content processing according to Embodiment 1.

The following describes the flow of content management processing in detail. First, a flow of processing of the content management apparatus 100 performed when the user uploads a content item from the mobile device 300 to the SNS server 200, outside of the home, is described. FIG. 6 is a flowchart showing the processing performed by the content management apparatus 100 in the above case.

First, the uploaded content detection unit 102 constantly supervises whether or not a new uploaded content item which is newly uploaded is present in the SNS server 200, using the management information of the uploaded content item stored on the uploaded content information storage unit 110 (S121). Then, when a new uploaded content item is detected (Yes in S121), the uploaded content detection unit 102 downloads the new uploaded content item from the SNS server 200. It is to be noted that the downloaded new uploaded content item is stored on the content management apparatus 100 or a home device (for example, the content storage unit 501 of the content storage device 500) (S122).

Next, the meta-information detection unit 103 determines whether meta-information is included in the downloaded new uploaded content item (S123).

When the new uploaded content item includes the meta-information (Yes in S123), the management information generation unit 104 generates management information of the new uploaded content item using the meta-information and the attribute information (a date and time of creation, data size, resolution, and so on) of the content item (S124). In other words, the management information includes the meta-information and the attribute information.

In contrast, when the new uploaded content item does not include the meta-information (No in S123), the management information generation unit 104 generates management information of the new uploaded content item using the only the attribute information of the content item (S125). In other words, the management information includes the attribute information.

Finally, the management information generation unit 104 stores the management information generated in S124 or S125 on the uploaded content information storage unit 110 (S126).

With the above processing, every time a new uploaded content item is uploaded to the SNS server 200, management information of the new uploaded content item is generated, and the generated management information is stored on the uploaded content information storage unit 110.

Figure 7:
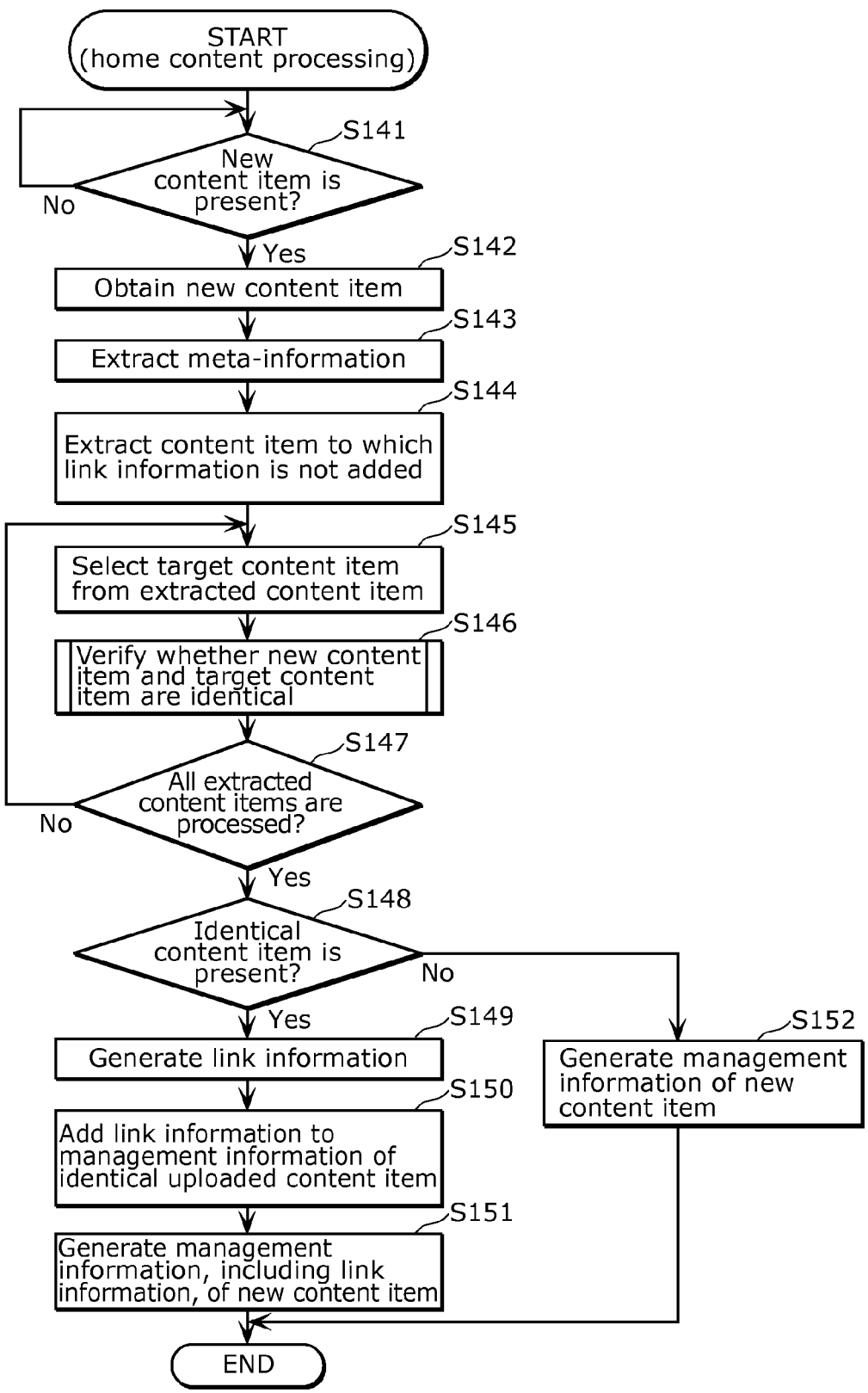
FIG. 7 is a flowchart of home content processing according to Embodiment 1.

Next, with reference to FIG. 7, the following describes a flow of processing performed by the content management apparatus 110 when the user brings home the mobile device 300 from outside of the home and connects the mobile device 300 to the home network for the first time. FIG. 7 is a flowchart showing processing performed by the content management apparatus 100 in the above case.

The home content detection unit 106 constantly checks, using the management information of the home content item stored on the home content information storage unit 111, whether or not a new content item, which is newly stored on the content storage unit 302 of the mobile device 300 newly connected to the home network, is present (S141). When a new content item is detected (Yes in S141), the home content detection unit 106 obtains the new content item from the content storage unit 302 of the mobile device 300 via the home network (S142).

Next, the meta-information detection unit 103 extracts the meta-information from the new content item obtained from the mobile device 300 (S143).

Next, the identification unit 107 extracts, using the management information stored on the uploaded content information storage unit 110, an unlinked content item whose management information does not include link information, out of the uploaded content items uploaded to the SNS server 200 (S144). In other words, the unlinked content item is an uploaded content item whose original content item identical to the unlinked content item has not been found out of the uploaded content items.

Next, the identification unit 107 selects any one of the extracted unlinked content items as a target content item (S145). Then, the identification unit 107: refers to the storage location (device number, storage position in the storage unit in each device, and so on) of the target content item which is described in its management information; and reads the target content item from the storage location.

Then, the identification unit 107 verifies whether the new content item obtained from the mobile device 300 in S142 and the target content item selected in S145 are identical (S146).

Figure 8:
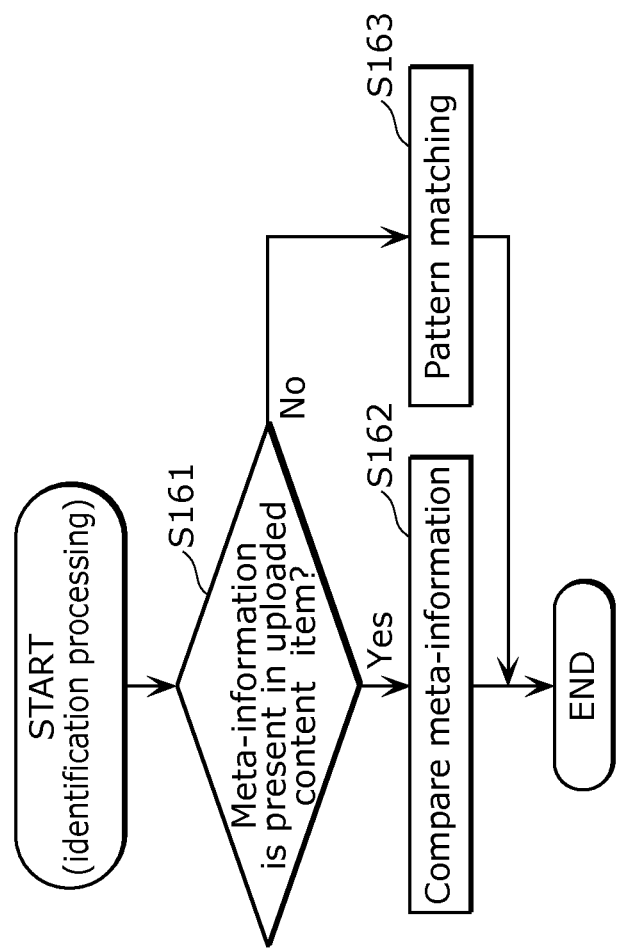
FIG. 8 is a flowchart of identification processing according to Embodiment 1.

The following describes a scheme for identification. FIG. 8 is a flowchart of this identification processing.

First, the identification unit 107 determines whether the selected target content item (uploaded content item) includes meta-information (S161). When the target content item includes the meta-information (Yes in S161), the identification unit 107 compares the meta-information of the new content item and the meta-information of the target content item, to verify whether the two content items are identical (S162). For example, in the case where the content item is a photo, when the capturing information included in Exif and the like (time of capturing, location of capturing, capturing device, capturing condition, and so on) of the two meta-information items match, the identification unit 107 determines that the two content items are identical. Thus, even when the content item uploaded to the SNS is compressed, the identification unit 107 can determine whether or not the two content items are identical.

In contrast, when the target content item does not include meta-information (No in S161), the identification unit 107 verifies whether the two content items are identical by performing pattern matching on the two content items (S163). As a pattern matching scheme, many schemes have been conventionally proposed. Basically, the identification unit 107 extracts image feature (intensity per block, feature points based on edge information, and so on) from each content item, and compares the image feature, to calculate a degree of similarity of the two content items. Then, when the calculated degree of similarity is greater than or equal to a threshold, the identification unit 107 determines that the two content items are identical.

Description is provided again with reference to FIG. 7.

Processing of the above S145 and S146 is performed sequentially to all the content items extracted in S144 (S147).

When the identification processing on all the content items is ended (Yes in S147), the identification unit 107 determines whether a content item identical to the new content item obtained from the mobile device 300 is present in the unlinked content items extracted in S144 (S148). In other words, the identification unit 107 determines whether or not an uploaded content item whose original is the new content item is present.

When the uploaded content item identical to the new content item is present (Yes in S148), the link information generation unit 108 generates link information indicating that the uploaded content item is identical to the new content item (S149).

Next, the management information generation unit 104 embeds the link information generated by the link information generation unit 108 to the management information of the uploaded content item identical to the new content item, and stores the management information on the uploaded content information storage unit 110 (S150).

Furthermore, the management information generation unit 104 generates management information, including the link information, of the new content, and stores the generated management information on the home content information storage unit 111 (S151).

In contrast, when the content item identical to the new content item is not present (No in S148), the management information generation unit 104 generates management information of the new content item, and store the generated management information on the home content information storage unit 111 (S152). In other words, the management information generation unit 104 generates the management information of the new content item using the meta-information and the attribute information added to the new content item.

The foregoing is the description on the operation performed by the content management apparatus 100 according to the present embodiment.

As described above, the content management apparatus 100 separately stores the management information of the uploaded content item uploaded to the SNS server 200 by the user and the management information of the home content item stored on the home devices. When the mobile device 300 is connected to the home network after a content item is uploaded from the mobile device 300 to the SNS server 200, the content management apparatus 100 verifies whether the uploaded content item and the content item stored on the mobile device 300 are identical. Thus, the content management apparatus 100 can prevent the two content items from being double registered as unrelated content items. Accordingly, the content management apparatus 100 can centrally manage the uploaded content item uploaded to the SNS server 200 by the user and the home content item stored on the home devices.

Furthermore, the content management apparatus 100 performs the content identification processing on only the content items uploaded to the SNS server 200, instead of performing the processing on all the content items including the home content items. Thus, the content management apparatus 100 can shorten the processing time required for the identification.

Moreover, the content management apparatus 100 does not perform the content identification processing when a content item is newly uploaded to the SNS server 200, but performs the processing when a new content item in the home devices is detected. Thus, the content management apparatus 100 can shorten the processing time required for the identification.

Furthermore, the present embodiment is particularly effective in the case where the pattern matching or the like, which requires a long processing time, is used as the identification scheme.

Figure 9:
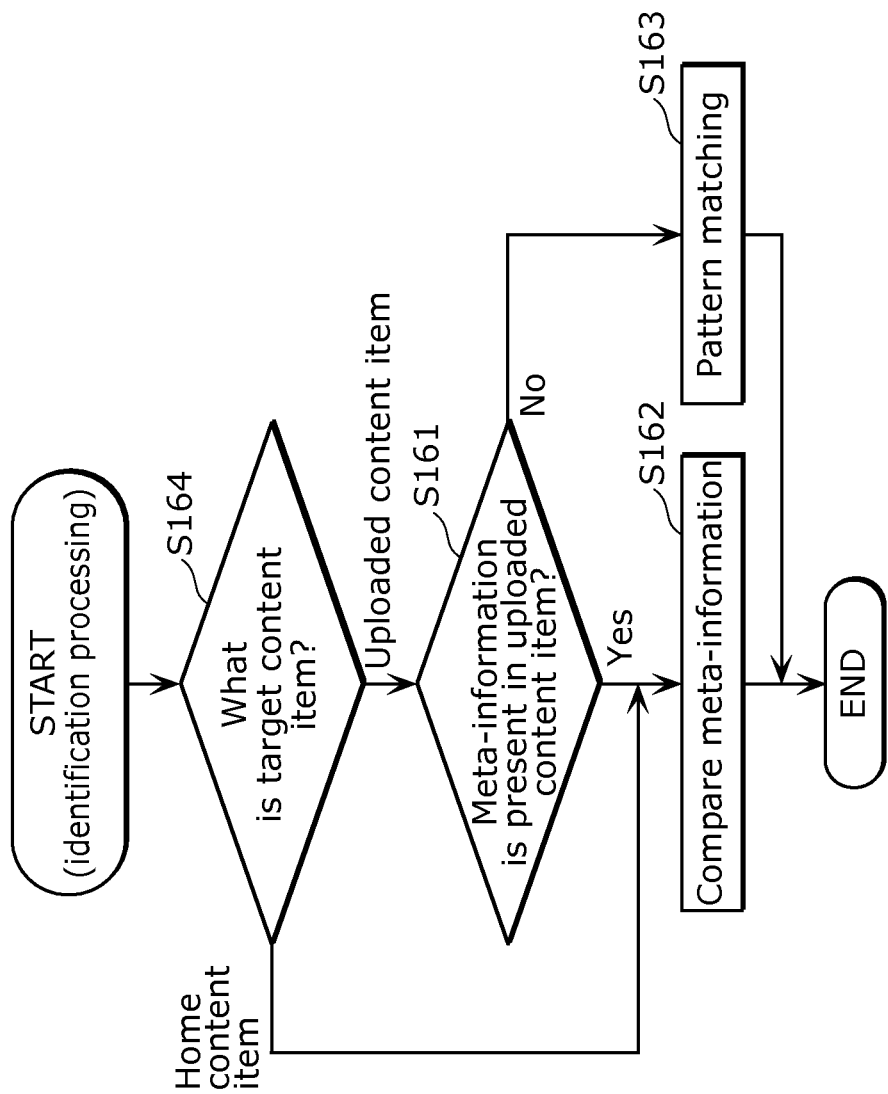
FIG. 9 is a flowchart of a modification of the identification processing according to Embodiment 1.

Although in the above description the identification unit 107 performs the identification processing on only the uploaded content item, the processing may also be performed on the home content items. FIG. 9 is a flowchart of the identification processing in this case. In the processing shown in FIG. 9, S164 is added to the processing shown in FIG. 8.

Specifically, when the target content item is the home content item (home content item in S164), the identification unit 107 verifies whether the two content items are identical, using the meta-information of the new content item and the meta-information of the target content item (S162). Specifically, when the information included in the two meta-information items are the same, the identification unit 107 determines that the two content items are identical.

It is to be noted that the processing performed when the target content item is the uploaded content item is the same as shown in FIG. 8.

[Embodiment 2]

In the present embodiment, description is provided on a modification of the content management apparatus 100 according to Embodiment 1.

Figure 10:
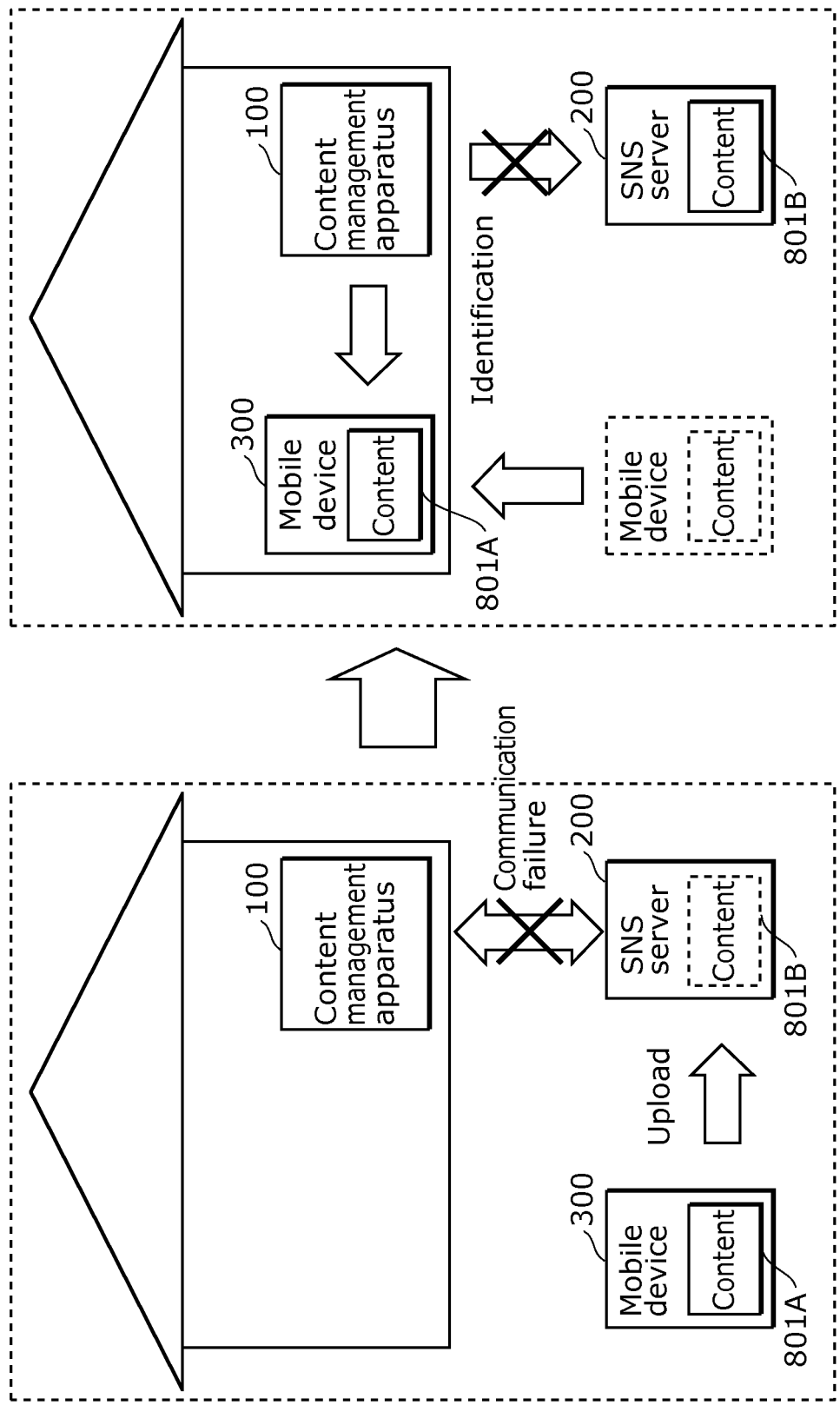
FIG. 10 is a schematic diagram for illustrating content management processing according to Embodiment 2.

FIG. 10 shows a problem of the content management system according to Embodiment 1. As shown in FIG. 10, because of a communication failure (network failure) or the like, there are cases where the content management apparatus 100 and the SNS server 200 cannot communicate. Under such a situation with a communication failure, when the user uploads the content item 801A from outside of the home to the SNS server 200 via the mobile device 300 and then brought home the mobile device 300 as described above, the content management apparatus 100 has not managed the content item 801B in the SNS server 200. Therefore, the management information of the content item 801A to which no link information is added is stored on the home content information storage unit 111.

When the communication is restored, the content management apparatus 100 detects the content item 801B uploaded to the SNS server 200 and generates the management information of the content item 801B. However, as described above, the identification processing on the content item 801A and the content item 801B is not performed in this case. As a result, it is not detected that the content item 801A and the content item 801B are identical, and the two content items are double registered. As described above, there are cases where the content management apparatus 100 according to above Embodiment 1 cannot centrally manage the uploaded content items and the home content items.

The content management apparatus 100A according to the present embodiment solves this problem. The content management apparatus 100A stores, on the SNS server 200, check time indicating the last day and time when the uploaded content item is checked. Then, when detecting a new content item, the content management apparatus 100A determines whether the new content item is the content item captured later than the above check time. When it is determined that the new content item is captured later than the above check time, the content management apparatus 100A does not perform the identification processing at this timing but performs the identification processing after the check time is updated. With this, the content management apparatus 100A can solve the above-described problem.

The following describes the content management apparatus 100A according to the present embodiment and its operation. It is to be noted that the following description mainly focuses on difference from Embodiment 1 to omit overlapped description.

Figure 11:
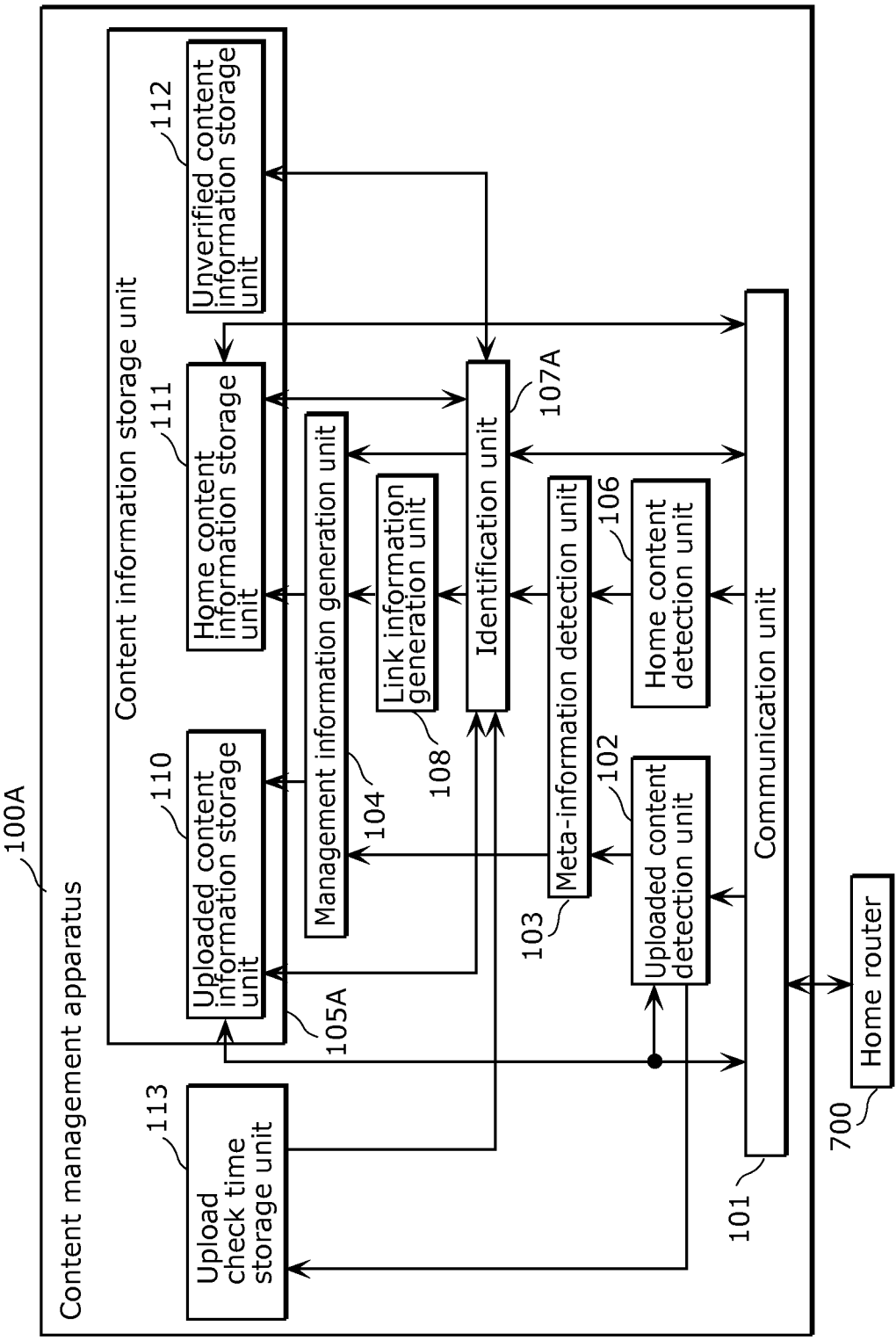
FIG. 11 is a block diagram of a content management apparatus according to Embodiment 2.

FIG. 11 is a block diagram showing the content management apparatus 100A according to the present embodiment. In addition to the content management apparatus 100 shown in FIG. 3, the content management apparatus 100A shown in FIG. 11 includes an upload check time storage unit 113. Furthermore, the function of each of the content information storage unit 105A and the identification unit 107A is different from that of the content information storage unit 105 and the identification unit 107.

The upload check time storage unit 113 stores upload check time indicating the last day and time when the uploaded content detection unit 102 checked the uploaded content item on the SNS server 200. Specifically, the upload check time is the last time when there is no communication failure and the uploaded content detection unit 102 has successfully checked the uploaded content item. Here, the uploaded content detection unit 102 checks the content items uploaded to the SNS server 200 in every given time period, to detect a content item newly uploaded to the SNS server 200. Furthermore, every time the check is performed successfully, the uploaded content detection unit 102 updates the upload check time held in the upload check time storage unit 113 to the current day and time.

In addition to the configuration of the content information storage unit 105, the content information storage unit 105A includes an unverified content information storage unit 112. The unverified content information storage unit 112 stores management information of an unverified content item on which the identification unit 107A has not performed the identification processing.

In addition to the operation performed by the identification unit 107, when a new content item is detected at home, the identification unit 107A determines whether or not to perform the identification processing. Specifically, the identification unit 107A compares the capturing time of the new content item and the upload check time stored on the upload check time storage unit 113. Then, when the capturing time is earlier than the upload check time, the identification unit 107A verifies whether the new content item and the uploaded content item are identical.

In contrast, when the capturing time is later than the check time, which means there may have been a communication failure or the like, the identification unit 107A does not perform the identification processing on the new content item at this point. Furthermore, management information of the new content item, on which the identification processing is not performed, is generated and stored on the unverified content information storage unit 112. Then, after the check time is updated and the updated check time has become later than the capturing time, the identification unit 107A verifies whether the unverified new content item and the uploaded content item are identical.

Next, a flow of the operation performed by the content management apparatus 100A is described.

It is to be noted that the processing of the content management apparatus 100A performed when the user uploads a content item from the mobile device 300 to the SNS server 200, outside of the home, is the same as in Embodiment 1.

Figure 12:
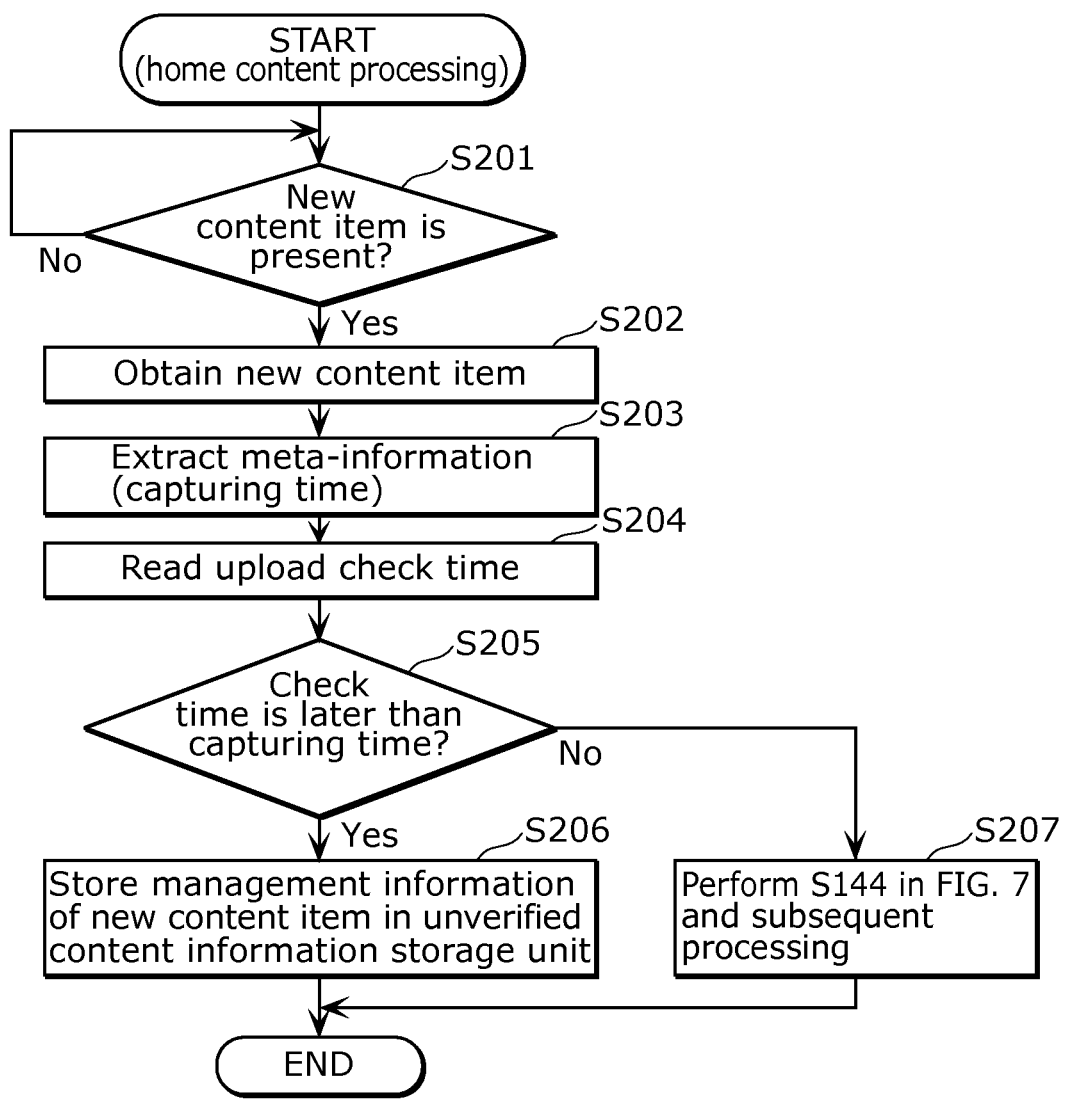
FIG. 12 is a flowchart of home content processing according to Embodiment 2.

The following describes, with reference to FIG. 12, a flow of processing of the content management apparatus 100A performed when the user brings home the mobile device 300 from outside of the home and connects the mobile device 300 to the home network for the first time. FIG. 12 is a flowchart showing processing performed by the content management apparatus 100A in the above case.

The home content detection unit 106 constantly checks, using the management information of the home content items stored on the home content information storage unit 111, whether or not a new content item is present which is newly stored on the content storage unit 302 of the mobile device 300 newly connected to the home network (S201). When a new content item is detected (Yes in S201), the home content detection unit 106 obtains the new content item from the content storage unit 302 of the mobile device 300 via the home network (S202).

Next, the meta-information detection unit 103 extracts the meta-information from the new content item obtained from the mobile device 300. Specifically, the meta-information detection unit 103 obtains the capturing time of the new content item included in the meta-information (S203).

Next, the identification unit 107A reads the upload check time stored on the upload check time storage unit 113 (S204). Then, the identification unit 107A compares the capturing time of the new content item and the upload check time (S205).

When the capturing time of the new content item is later than the upload check time (Yes in S205), the identification unit 107A does not perform the identification processing at this point. Furthermore, the management information generation unit 104 generates management information of the new content item, and stores the generated management information on the unverified content information storage unit 112 (S206).

In contrast, when the capturing time of the new content item is earlier than the upload check time, the processing same as in Embodiment 1 (S144 shown in FIG. 7 and subsequent processing) is performed (S207).

Figure 13:
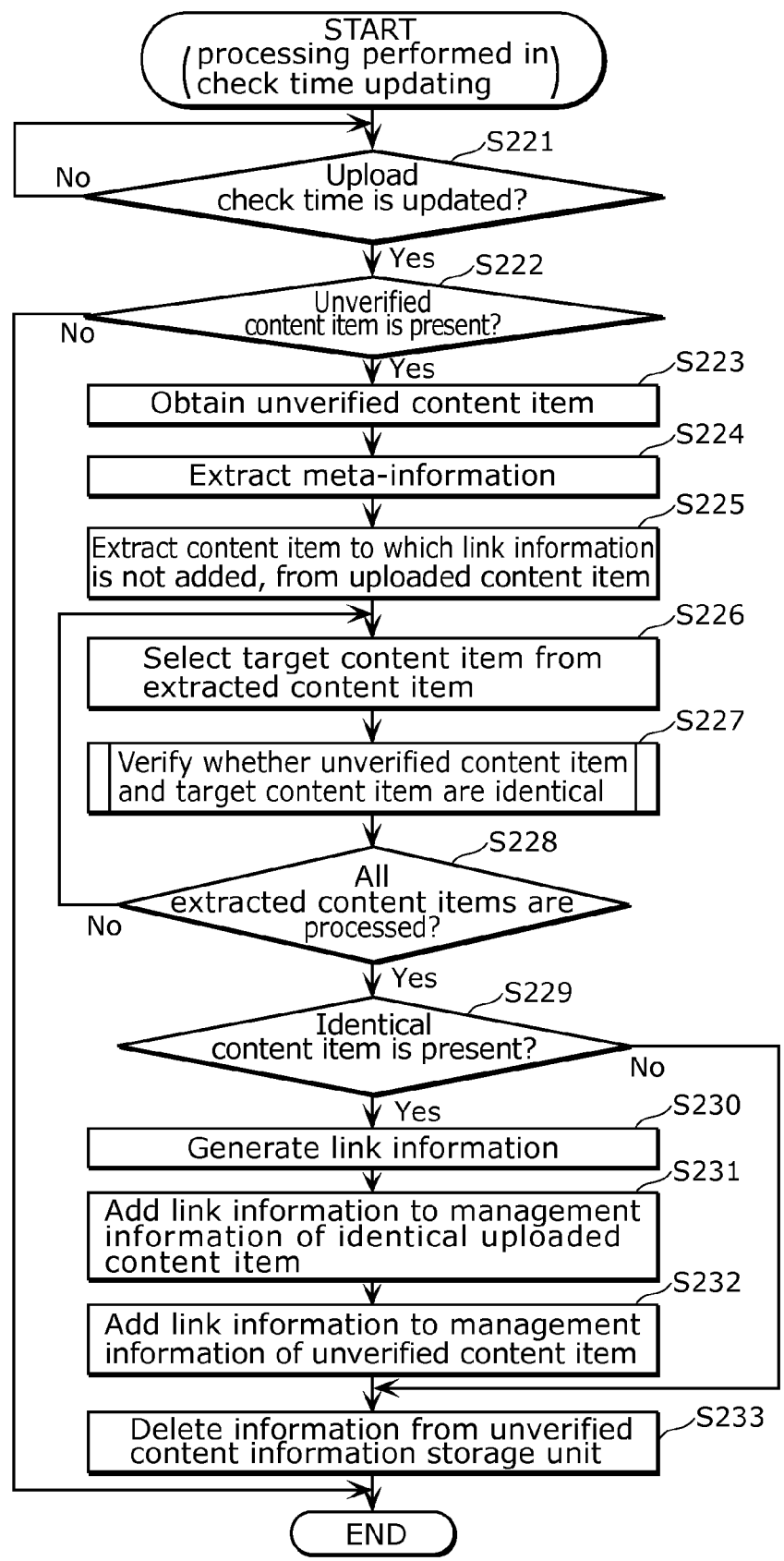
FIG. 13 is a flowchart of processing for updating check time according to Embodiment 2.

Next, description is provided on an operation performed by the content management apparatus 100A when the upload check time is updated. FIG. 13 is a flowchart of this operation.

The identification unit 107A constantly checks whether or not the upload check time stored on the upload check time storage unit 113 is updated (S221). When the upload check time is updated (Yes in S221), the identification unit 107A checks whether an unverified content item is present (S222). Specifically, the identification unit 107A checks whether the management information of the unverified content item is held in the unverified content information storage unit 112.

When an unverified content item is present (Yes in S222), the identification unit 107A refers to the management information of the unverified content item, and obtains the unverified content item from the storage location of the unverified content item (S223).

Next, the meta-information detection unit 103 extracts the meta-information from the obtained unverified content item (S224).

Next, the identification unit 107A extracts, using the management information stored on the uploaded content information storage unit 110, unlinked content items whose management information does not include link information, out of the uploaded content items uploaded to the SNS server 200 (S225).

Next, the identification unit 107A selects any one of the extracted unlinked content items (S226). Then, the identification unit 107A refers to the storage location of the selected target content item described in the management information of the target content item, and reads the target content item from the storage location.

Then, the identification unit 107A verifies whether the unverified content item and the target content item are identical (S227). It is to be noted that the details of the identification processing is the same as in Embodiment 1.

Processing of the above S226 and S227 is performed sequentially to all the content items extracted in S225 (S228).

When the identification processing on all the content items is ended (Yes in S228), the identification unit 107A determines whether a content item identical to the unverified content item is present in the content items extracted in S225 (S229). In other words, the identification unit 107A determines whether or not an uploaded content item whose original is the unverified content item is present.

When the uploaded content item identical to the unverified content item is present (Yes in S229), the link information generation unit 108 generates link information indicating that the uploaded content item is identical to the unverified content item (S230).

Next, the management information generation unit 104: embeds, to the management information of the uploaded content item identical to the unverified content item, the link information generated by the link information generation unit 108; and stores the management information on the uploaded content information storage unit 110 (S231).

Furthermore, the management information generation unit 104: embeds the link information to the management information of the unverified content item; and stores the management information on the home content information storage unit 111 (S232).

Furthermore, the management information generation unit 104 deletes, from the unverified content information storage unit 112, the management information of the unverified content item (S233).

In contrast, when the content item identical to the content item is not present (No in S229), the management information generation unit 104: stores the management information of the unverified content item, which is stored on the unverified content information storage unit 112, on the home content information storage unit 111; and deletes the management information of the unverified content item from the unverified content information storage unit 112 (S233).

In the above manner, the content management apparatus 100A stores, on the SNS server 200, the upload check time indicating the last day and time when the uploaded content item is checked. Then, when detecting a new content item, the content management apparatus 100A determines whether the new content item is the content item captured later than the upload check time. When the new content item is the content item captured later than the upload check time, the content management apparatus 100A does not perform the identification processing at this timing but performs the identification processing after the upload check time is updated. Thus, even in the case of a communication failure or the like, the content management apparatus 100A can perform identification on the content items correctly.

Although the foregoing has described the content management apparatus according to the embodiments of the present invention, the present invention is not limited to these embodiments.

For example, although the above description takes an example in which the identification is performed by authenticating the image patterns, the present invention may be applied to a case where another scheme is used for the identification. For example, the present invention may be applied to a case where additional information such as meta-information is used. Even in such a case, the target of identification can be narrowed down to only the uploaded content items, whereby the processing time can be shortened.

Furthermore, although the above description takes an example in which the content items held in the home devices connected via the home network are managed, the present invention can be also applied to a case where the content items held in devices connected to a network other than the home network are managed.

Furthermore, in the above description, the content information storage unit 105 (105A) includes the uploaded content information storage unit 110 and the home content information storage unit 111. The uploaded content information storage unit 110 and the home content information storage unit 111 may be realized with different memory devices, and may be realized as different memory areas included in a single memory device. Moreover, the scheme for distinguishing management information of the uploaded content item from the management information of the home content item is not limited to the scheme to divide the storage areas, and can be realized by: a scheme in which flag information or the like is added to each of the management information items; or a scheme in which information (ID etc.) for identifying the uploaded content item or the home content item, is stored.

Furthermore, although the above description takes an example in which the mobile device 300 is connected to the home network, the same operation as the above is performed for the case where the mobile device 300 is connected to a home device and the content items held in the mobile device 300 are moved or copied to the home device.

Furthermore, it is to be noted that in each of the above non-limiting embodiments, each constituent element may be implemented by being configured with dedicated hardware or by executing a software program appropriate for each constituent element. Each constituent element may be implemented by reading and executing the software program recorded on a hard disk or a recording medium such as a semiconductor memory, performed by a program execution unit such as a CPU or a processor.

Moreover, a part or all of the constituent elements included in each of the apparatuses above may include a single System Large Scale integration (System LSI). The System LSI is a super multifunctional LSI manufactured by integrating plural constituent elements on a single chip, and is specifically a computer system including a microprocessor, a ROM, a RAM, and so on. The RAM has a computer program stored. The system LSI achieves its functions through the microprocessor's operation according to the computer program.

Furthermore, a part or all of the constituent elements constituting the respective apparatuses may be configured as an IC card which can be attached and detached from the respective apparatuses, or as a stand-alone module. The IC card or the module may be a computer system including the microprocessor, ROM, RAM, and so on. The IC card or the module may also include the above super-multi-function LSI. The IC card or the module achieves its functions through the microprocessor's operation according to the computer program. The IC card or the module may also be implemented to be tamper-resistant.

Furthermore, the present invention may be a method of the above. Furthermore, the present invention may be a computer program for realizing such a method, using a computer, and may also be a digital signal including the above computer program.

Furthermore, the present invention may also be realized by storing the above computer program or digital signal on a computer readable recording medium such as a flexible disc, a hard disk, a CD-ROM, an MO, a DVD, a DVD-ROM, a DVD-RAM, a BD (Blu-ray Disc (registered trademark)), a USB memory, a memory card such as an SD card, or a semiconductor memory. Furthermore, the present invention may also include the digital signal recorded in these recording media.

Furthermore, the present invention may also be realized by the transmission of the above computer program or digital signal via a telecommunication line, a wireless or wired communication line, a network represented by the Internet, data broadcasting, or the like.

Furthermore, the present invention may be a computer system including a microprocessor and a memory, and the above memory may store the above computer program and the microprocessor may operate according to the above computer program.

Furthermore, the above apparatus may be implemented by an independent and different computer system, by recording the above program or digital signal on the above recording medium and transferring, or by transferring the above program or digital signal via the above network or the like.

Furthermore, all of the numerals used in the above are used for exemplification purpose for describing the present invention more specifically, and therefore the present invention is not limited to the numerals exemplified.

Furthermore, the division of the functional block in the block diagrams is just an example. The functional blocks may be realized as a single functional block, the single functional block may be divided into functional blocks, or part of the function may be moved to another functional block. Furthermore, functions of functional blocks having a function similar to one another may be processed by single hardware or software in parallel or in a time-sharing manner.

Furthermore, the order of the steps included in the content management method is performed is shown only to exemplify the present invention specifically, and the order is not limited to the above. Furthermore, part of the above steps may be performed simultaneously (parallely) with another step.

Although the foregoing has described the content management apparatus according to one or more embodiments, the present invention is not limited to these embodiments. Other forms in which various modifications apparent to those skilled in the art are applied to the embodiments, or forms structured by combining constituent elements of different embodiments are included within the scope of the embodiments, unless such changes and modifications depart from the scope of the present invention.

INDUSTRIAL APPLICABILITY

The present invention can be applied to a content management apparatus.

REFERENCE SIGNS LIST

100, 100A Content management apparatus
101, 201, 303, 404, 502 Communication unit
102 Uploaded content detection unit
103 Meta-information detection unit
104 Management information generation unit
105, 105A Content information storage unit
106 Home content detection unit
107, 107A Identification unit
108 Link information generation unit
110 Uploaded content information storage unit
111 Home content information storage unit 112 Unverified content information storage unit
113 Upload check time storage unit
200 SNS server
202 Content conversion unit
203 Content database
300 Mobile device
301 Camera
302, 401, 501 Content storage unit
400 Content reproduction device
402 Content display unit
403 Operation unit
500 Content storage device
600 Internet
700 Home router

The invention claimed is:

1. A content management apparatus which manages content items owned by a user, the content management apparatus comprising:
 a first detection unit configured to detect a content item uploaded to a network service by the user;
 a management information generation unit configured to generate: management information of the content item uploaded to the network service by the user; and management information of a content item stored on a device connected to the content management apparatus via a network;
 a first management information storage unit configured to store the management information of the uploaded content item;
 a second management information storage unit configured to store the management information of the content item stored on the device;
 a second detection unit configured to detect a new content item newly stored on the device;
 an identification unit configured to verify using a first scheme whether the new content item and a first content item are identical when the new content item is detected, the first content item being a content item whose management information is stored on the first management storage unit out of the first management information storage unit and the second management information storage unit; and
 a link information generation unit configured to generate link information when the first content item and the new content item are identical, the link information indicating that the first content item and the new content item are identical,
 wherein the management information generation unit is configured to (1) add the link information to the management information of the first content item or (2) generate management information, including the link information, of the new content item.

2. The content management apparatus according to claim 1,
 wherein the identification unit is configured to, as the first scheme, perform image pattern matching on the new content item and the first content item.

3. The content management apparatus according to claim 2,
 wherein meta-information is added to the new content item and the content item stored on the device, the meta-information indicating at least one of: a date and time when the content item is captured; and an environment in which the content item is captured, and
 the identification unit is further configured to verify whether the new content item and the content item stored on the device are identical, using the meta-information added to the new content item and the meta-information added to the content item stored on the device.

4. The content management apparatus according to claim 2,
 wherein the meta-information is not added to the uploaded content item, the meta-information indicating at least one of: a date and time when the content item is captured; and an environment in which the content item is captured.

5. The content management apparatus according to claim 1,
 wherein the first management information storage unit is configured to store management information items of uploaded content items including the uploaded content item, and
 when the new content item is detected, the identification unit is configured to: determine an unlinked content item; and verify using the first scheme whether the unlinked content item and the new content item are identical, the unlinked content item being a first content item to which the link information is not added out of first content items whose management information is stored on the first management information storage unit.

6. The content management apparatus according to claim 1,
 wherein the network is a home network,
 the uploaded content item is a content item based on a second content item held by a mobile device and uploaded by the user from the mobile device to the network service not via the home network, and
 the second detection unit is configured to, when the mobile device is connected to the home network, detect the second content item held by the mobile device as the new content item.

7. The content management apparatus according to claim 1, further comprising
 a third management information storage unit configured to store management information of an unverified content item,
 wherein, when the new content item is detected, the identification unit is configured to:
 compare a capturing time of the new content item with a check time indicating a last time at which the first detection unit has successfully checked a content item uploaded to the network service to detect the content item uploaded to the network service;
 when the capturing time is earlier than the check time, verify using a first scheme whether the new content item and the first content item are identical; and
 when the capturing time is later than the check time, after the check time is updated and the updated check time has become later than the capturing time, verify whether the new content item and the first content item are identical.

8. A content management method for a content management apparatus which manages content items owned by a user, the content management method comprising:
 detecting a content item uploaded to a network service by the user;
 generating management information of the content item uploaded to the network service by the user;
 storing the management information of the uploaded content item on a first management information storage unit;
 generating management information of a content item stored on a device connected to the content management apparatus via a network;

storing the management information of the content item stored on the device on a second management information storage unit;

detecting a new content item newly stored on the device;

verifying using a first scheme whether the new content item and a first content item are identical when the new content item is detected, the first content item being a content item whose management information is stored on the first management storage unit out of the first management information storage unit and the second management information storage unit;

generating link information when the first content item and the new content item are identical, the link information indicating that the first content item and the new content item are identical; and (1) adding the link information to the management information of the first content item or (2) generating management information, including the link information, of the new content item.

9. A non-transitory computer-readable recording medium on which a program is recorded for causing a computer to execute the content management method according to claim 8.

10. An integrated circuit which manages content items owned by a user, the integrated circuit comprising:

a first detection unit configured to detect a content item uploaded to a network service by the user;

a management information generation unit configured to generate: management information of the content item uploaded to the network service by the user; and management information of a content item stored on a device connected to the content management apparatus via a network;

a first management information storage unit configured to store the management information of the uploaded content item;

a second management information storage unit configured to store the management information of the content item stored on the device;

a second detection unit configured to detect a new content item newly stored on the device;

an identification unit configured to verify using a first scheme whether the new content item and a first content item are identical when the new content item is detected, the first content item being a content item whose management information is stored on the first management storage unit out of the first management information storage unit and the second management information storage unit; and a link information generation unit configured to generate link information when the first content item and the new content item are identical, the link information indicating that the first content item and the new content item are identical, wherein the management information generation unit is configured to (1) add the link information to the management information of the first content item or (2) generate management information, including the link information, of the new content item.

* * * * *